March 19, 1957 J. P. RUTH 2,785,963
EXHAUST GAS CONDITIONER
Filed Oct. 18, 1954

INVENTOR.
Joseph P. Ruth
BY
ATTORNEY

United States Patent Office 2,785,963
Patented Mar. 19, 1957

2,785,963

EXHAUST GAS CONDITIONER

Joseph P. Ruth, Denver, Colo.

Application October 18, 1954, Serial No. 462,891

5 Claims. (Cl. 23—284)

As a development from and an improvement over the apparatus disclosed in my patents, Number 2,677,601, dated May 4, 1954; Number 2,678,261, dated May 11, 1954; and my pending application Serial No. 396,049, filed December 3, 1953, the instant invention relates to exhaust gas conditioners operable in accordance with and to give effect to the principles of the method described in my Patent No. 2,611,680, dated September 23, 1952, and has as an object to provide a novel, improved, and efficient construction and organization of elements constituting an exhaust gas conditioner.

A further object of the invention is to provide an organization and correlation of elements of enhanced operative advantage in the amelioration of internal combustion engine exhaust gases circulated therethrough in reaction to the gas output pressures.

A further object of the invention is to provide an exhaust gas conditioner construction eliminative of certain shortcomings of hitherto known analogous units.

A further object of the invention is to provide an exhaust gas conditioner construction operable to effect efficient and repetitious exposure of exhaust gases to ameliorating influences under the sole influence of the exhaust gas output pressures.

A further object of the invention is to provide an exhaust gas conditioner that is simple and inexpensive of production in appropriate sizes and capacities, that is adaptable to operative association with a variety of particular engine installations, that is free from onerous maintenance and servicing requirements, that is susceptible of convenient rehabilitation and repair, and that is efficient in the attainment of the purposes for which designed throughout long periods of practical use.

With the foregoing and other objects in view, my invention consists in the construction, arrangement, and operative combination of elements as hereinafter described, pointed out in my claims, and illustrated by the accompanying drawing, in which—

Figures 1, 2, 3:
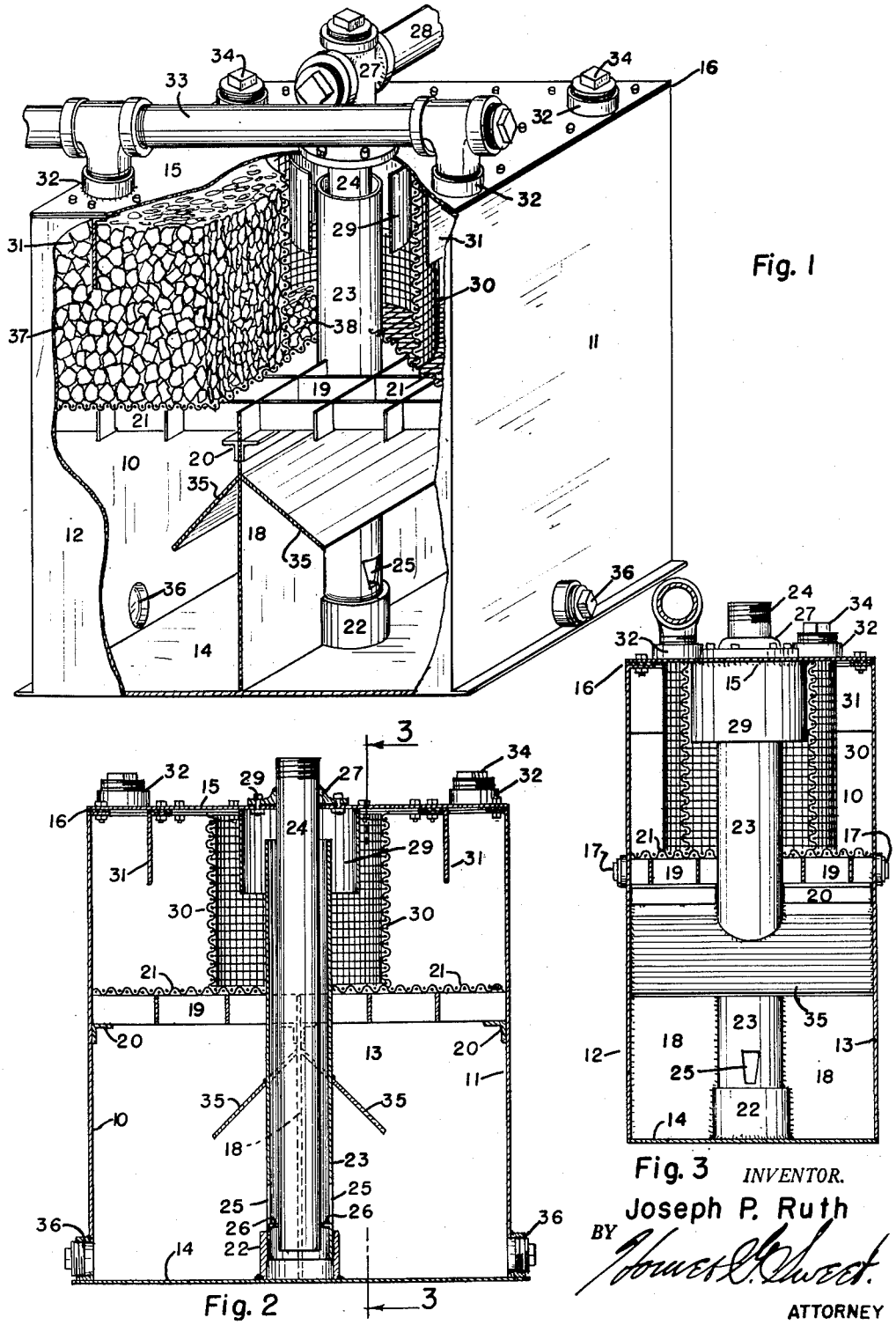
Figure 1 is an isometric view of a typical embodiment of the invention as organized ready for practical use, portions of an exterior housing being broken away to disclose otherwise concealed construction.
Figure 2 is a cross section taken substantially vertically, longitudinally, and centrally through the organization according to Figure 1 with certain elements of the former view omitted.
Figure 3 is a cross section taken substantially on the indicated line 3—3 of Figure 2.

The various elements and features of the invention are assembled within or associated with a preferably rectangular exterior housing comprised from spacedly-parallel, flat end walls 10 and 11 marginally closing against the edges of spacedly-parallel, flat side walls 12 and 13, a flat bottom panel 14 sealed to the lower edges of said end and side walls, and a top closure panel 15 detachably engaged, preferably through the medium of a gasket 16, with flanges at the upper edges of said side and end walls.

The lower portion of the housing functions as a reservoir to confine a charge of water in a maximum depth determined by one or more plugged ports 17 in the side walls 12 and 13 slightly above the mid-height of said walls, and a flat partition 18 spaced from and parallel to the end walls 10 and 11 closes against the side walls 12 and 13 and the bottom 14 to divide the reservoir portion of the housing into two equal compartments and rises interiorly of the housing to project its upper edge above the liquid level determined by the ports 17. A rigid, open grid 19 is supported, as by means of brackets 20 fixed to the end walls 10 and 11 and partition 18, in spaced parallelism with the housing bottom 14 at or just above the liquid level determined by the ports 17 and provides support for a reticulate or foraminous sheet 21 which spans entirely across the housing interior in edge-closing relation with the housing side and end walls.

A tubular fitting 22 is fixed to and upstands centrally from the bottom panel 14 in intersecting relation with the lower portion of the partition 18 to threadedly receive the lower end of a tubular conduit 23 thereby mounted to upstand perpendicular to the panel 14 centrally within the housing. The conduit 23 divides and is sealed to the partition 18, extends upwardly through the grid 19 and sheet 21, and terminates in an open upper end spaced a substantial distance below the top panel 15. Sealed through and centrally of the top panel 15, an input tube 24 is provided in a size and disposition for coaxial, telescopic registration within the conduit 23 and in a length such as to dispose its open lower end within and slightly below the upper margin of the fitting 22 when the panel 15 is secured in closing relation with the housing. The exterior diameter of the tube 24 is sufficiently less than the interior diameter of the conduit 23 to leave an annular space adequate for the circulation therein of liquid between the associated conduit and tube, and just above the fitting 22 opposite walls of the conduit 23 are intersected by vertically-elongated, downwardly-tapered openings 25 directed to the compartments at the opposite sides of the partition 18 and terminating at their lower ends in flanges 26 inturned to close against the adjacent surfaces of the tube 24. The upper end of the tube 24 exterior to the housing is connected through a suitable fitting 27 with the exhaust gas flow line 28 leading from an internal combustion engine, and the associated conduit 23 and tube 24 function with water present in the lower portion of the housing and a flow of exhaust gas through the line 28 as a pump or lift operable in reaction to the delivery of exhaust gas through the open lower end of the tube 24 to thoroughly mix and agitate the delivered gas in and with water entering the conduit through the openings 25 and to elevate the gas-water mixture upwardly through the conduit and exteriorly about the tube for discharge from the open upper end of the conduit below the top panel 15. The flanges 26 at the lower end of the conduit openings 25 serve not only to steady and position the lower end of the tube 24 but also operate to deflect water inflowing to the conduit circumferentially of the tube 24 and into the path of the incoming gas as spirally deflected by and swirling in reaction to said flanges.

Fixed at one end to the top panel 15 in concentric relation with the tube 24, a cylindrical skirt 29 depends interiorly of the housing when the panel 15 is in closing relation therewith, said skirt having a diameter considerably exceeding that of the conduit 23 and an axial length such as to dispose its lower end between the sheet 21 and the open upper end of the conduit in an annular spacing from and about the latter. Spacedly about and concentric with the skirt 29, a tubular sleeve 30 of reticulate or foraminous material is disposed in any appropriate attachment to the top panel 15 or sheet 21 to span between said sheet and top panel for the definition of a cylindrical chamber or well housing the skirt 29 and upper portion of the conduit 23 in that portion of the housing above the sheet 21 and below the top panel 15. Similarly spaced inwardly from and disposed to parallel the housing end walls 10 and 11, baffles 31 close at their ends against and span between the housing side walls 12 and 13 in sealing coaction of their upper margins with the top panel 15 to define like outlet compartments at the upper end corners of the housing from which discharge of gases may be had through thimbles 32 carried by and adjacent the corners of said panel 15. The baffles 31 depend within the housing a distance somewhat less than half the space between the panel 15 and sheet 21 and are spaced from the adjacent housing end walls so as to approximately divide the minimum distance separating the sleeve 30 from said end walls. The thimbles 32 are provided for the mounting and operative connection of an outflow line 33 through which the output from the housing may be led and directed to ultimate discharge, when such an arrangement is desired; it being expedient to connect corresponding thimbles at the opposite ends of the housing with a single line 33, as shown in Figure 1, in which event the remaining thimbles 32 are plugged, as at 34. Completing the structural organization of the improvement, deflectors 35 are fixed to opposite sides of partition 18 a short distance below the grid 19 and incline outwardly and downwardly from their line of attachment to the partition in spanning relation transversely of the housing, and plugged drain ports 36 open through the housing end walls 10 and 11 adjacent the bottom panel 14.

For operation as an exhaust gas conditioner in accordance with the principles of my Patent No. 2,611,680, the housing is charged with water to the level determined by the ports 17, an intersticed charge of broken limerock, or equivalent material, indicated at 37, is placed within and to substantially fill the space in the upper portion of the housing above the sheet 21 and about the sleeve 30, said charge rising into close proximity with the top panel 15 on both sides of the baffle 31, and, preferably although not necessarily, a shallow layer of the material forming the charge 37 is placed within the sleeve 30 and about the conduit 23 in supported relation upon the sheet 21, as indicated at 38. Organized and charged as shown and described, the ports 17 and 36 being plugged, certain of the thimbles 32 being connected with the outflow line 33, the unused thimbles 32 being plugged, and the line 28 being connected for inflow of exhaust gases from an internal combustion engine through the fitting 27 and to the tube 24, the unit is operable to treat and condition the input of exhaust gases in automatic reaction to the flow pressure thereof.

As should be readily manifest, the exhaust gas inflow through the tube 24 escapes from the lower end of said tube within the fitting 22 and rises through the annular space between said tube and the surrounding conduit 23 for intimate diffusion within and agitation of water incoming to said conduit from the two lower compartments of the housing through the openings 25; the shape of said openings and the presence and disposition of the flanges 26 functioning to assure a thorough and intimate admixture of the gas and water as the inherent bouyancy of the gas operates to elevate the mixture through and for discharge from the open upper end of the conduit. The gas-water mixture escaping from the upper end of the conduit 23 impinges against and is deflected by the superjacent area of the top panel 15 and is constrained by the skirt 29 to return toward the housing water charge interiorly of the sleeve 30 and through the sheet 21 and any charge of material 38 which may be present within the sleeve. The paths for escape of gases from the housing lead about lower margins of the baffles 31 through the charge 37 and upper end compartments of the housing to the thimbles 32 and outflow line 33, it being quite impossible for any gas to reach the outflow line without traversing an extended and tortuous path through the charge 37. As the wetted gas travels past the lower margin of the skirt 29 and the lower edges of the baffles 31 to find outlet from the housing, it is repetitiously scrubbed against and between surfaces of the elements comprising the charges 37 and 38 and thoroughly wets the charge surfaces to condition the limerock for corrective reaction with the charge material, all as is fully described in my earlier patent, above noted. Through contact with the water introduced through the openings 25 and through expansion within the skirt 29 and sleeve 30, the hot gases are cooled for outflow from the housing at moderate temperatures, and as the gases enter and pass through the sleeve 30 they are promptly cleared of entrained solid particles which fall through the sheet 21 and grid 19 to the water charge in the lower compartments of the housing where they are directed by the deflectors 35 away from the openings 25 and collected as a non-circulating sludge on the outward portions of the bottom panel 14. Water and water vapors entrained by the gases are condensed and deposited as the gas-water mixture traverses the charges 37 and 38, the water so deposited in excess of that necessary to film the charge material dripping through the sheet 21 and grid 19 for return to and reuse with the housing water charge. In a size and capacity adequately proportioned to the input of exhaust gases, the improved unit neutralizes and eliminates the noxious and irritating properties and constituents of the gas for ultimate discharge of a harmless, cool vapor free from objectionable properties, all in reaction to the normal flow pressures of the exhaust gases and without the development of adverse back pressures.

Since changes, variations, and modifications in the form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. An exhaust gas conditioner comprising a closed, rectangular housing formed with spacedly-parallel side and end walls, a bottom panel and a detachable top closure panel, a foraminous sheet intermediately paralleling said top and bottom panels and dividing the housing interior into an upper portion and a lower portion adapted to confine a charge of water, a conduit fixed centrally to and upstanding perpendicularly from said bottom panel through said sheet with its open upper end spaced from the top panel, a cylindrical skirt fixedly depending from said top panel spacedly and concentrically about said conduit and terminating in an open lower end above said sheet and below the conduit upper end, a foraminous tubular sleeve spacedly and concentrically about said skirt in closing relation between said sheet and top panel, baffles depending from said top panel inwardly from and parallel to the housing end walls to define compartments at the upper end corners of the housing opening toward and above said sheet, outlets from said compartments through the top panel, infeed openings in and upwardly adjacent the lower end of the conduit, an intersticed charge of alkaline material supported by said sheet to substantially fill the housing upper portion about said foraminous sleeve and said compartments, and an exhaust gas input tube through the top panel spacedly and coaxially within said conduit with its delivery end below the infeed openings of the conduit.

2. An exhaust gas conditioner comprising a closed, rectangular housing formed with spacedly-parallel side and end walls, a bottom panel and a detachable top closure panel, a foraminous sheet intermediately paralleling said top and bottom panels and dividing the housing interior into an upper portion and a lower portion adapted to confine a charge of water, a conduit fixed centrally to and upstanding perpendicularly from said bottom panel through said sheet with its open upper end spaced from the top panel, a partition at and closing against opposite sides of said conduit in spaced parallelism with the housing end walls to divide the housing lower portion beneath said sheet, a cylindrical skirt fixedly depending from said top panel spacedly and concentrically about said conduit and terminating in an open lower end above said sheet and below the conduit upper end, a foraminous tubular sleeve spacedly and concentrically about said skirt in closing relation between said sheet and top panel, baffles depending from said top panel inwardly from and parallel to the housing end walls to define compartments at the upper end corners of the housing opening toward and above said sheet, outlets from said compartments through the top panel, infeed openings in and upwardly adjacent the lower end of the conduit at each side of the partition, an intersticed charge of alkaline material supported by said sheet to substantially fill the housing upper portion about said foraminous sleeve and said compartments, and an exhaust gas input tube through the top panel spacedly and coaxially within said conduit with its delivery end below the infeed openings of the conduit.

3. An exhaust gas conditioner comprising a closed, rectangular housing formed with spacedly-parallel side and end walls, a bottom panel and a detachable top closure panel, a foraminous sheet intermediately paralleling said top and bottom panels and dividing the housing interior into an upper portion and a lower portion adapted to confine a charge of water, a conduit fixed centrally to and upstanding perpendicularly from said bottom panel through said sheet with its open upper end spaced from the top panel, a partition at and closing against opposite sides of said conduit in spaced parallelism with the housing end walls to divide the housing lower portion beneath said sheet, a cylindrical skirt fixedly depending from said top panel spacedly and concentrically about said conduit and terminating in an open lower end above said sheet and below the conduit upper end, a foraminous tubular sleeve spacedly and concentrically about said skirt in closing relation between said sheet and top panel, baffles depending from said top panel inwardly from and parallel to the housing end walls to define compartments at the upper end corners of the housing opening toward and above said sheet, outlets from said compartments through the top panel, infeed openings in and upwardly adjacent the lower end of the conduit at each side of the partition, an intersticed charge of alkaline material supported by said sheet to substantially fill the housing upper portion about said foraminous sleeve and said compartments, an exhaust gas input tube through the top panel spacedly and coaxially within said conduit with its delivery end below the infeed openings of the conduit, and deflectors spacedly parallel to the upper margin of the partition inclined outwardly and downwardly from the opposite sides of the partition above the conduit infeed openings.

4. In an exhaust gas conditioner having a closed, rectangular housing formed with spacedly-parallel side and end walls, a bottom panel and a detachable top closure panel, a foraminous sheet intermediately paralleling said top and bottom panels and dividing the housing interior into an upper portion and a lower portion adapted to confine a charge of water, a conduit fixed centrally to and upstanding perpendicularly from said bottom panel through said sheet with its open upper end spaced from the top panel, and an exhaust gas input line through the top panel spacedly and coaxially within said conduit with its delivery end adjacent the conduit lower end, the improvements which comprise a partition at and closing against the opposite sides of said conduit in spaced parallelism with the housing end walls to divide the housing lower portion beneath said sheet, infeed openings in the lower end of the conduit at each side of said partition and above the delivery end of the gas input line, a cylindrical skirt fixedly depending from said top panel spacedly and concentrically about said conduit and terminating in an open lower end above said sheet and below the conduit upper end, a foraminous tubular sleeve spacedly and concentrically about the skirt in closing relation between said sheet and top panel, baffles depending from said top panel inwardly from and parallel to the housing end walls to define compartments at the upper end corners of the housing opening toward and above said sheet, and outlets opening from said compartments through the top panel; together with an intersticed charge of alkaline material supported by said sheet to substantially fill the housing upper portion about said foraminous sleeve and said compartments.

5. In an exhaust gas conditioner having a closed, rectangular housing formed with spacedly-parallel side and end walls, a bottom panel and a detachable top closure panel, a foraminous sheet intermediately paralleling said top and bottom panels and dividing the housing interior into an upper portion and a lower portion adapted to confine a charge of water, a conduit fixed centrally to and upstanding perpendicularly from said bottom panel through said sheet with its open upper end spaced from the top panel, infeed openings in and upwardly adjacent the lower end of said conduit, and an exhaust gas input line through the top panel spacedly and coaxially within said conduit with its delivery end below said infeed openings, the improvements which comprise a cylindrical skirt fixedly depending from the top panel spacedly and concentrically about said conduit and terminating in an open lower end above said sheet and below the conduit upper end, a foraminous tubular sleeve spacedly and concentrically about said skirt in closing relation between said sheet and top panel, baffles depending from said top panel inwardly from and parallel to the housing end walls to define compartments at the upper end corners of the housing opening toward and above said sheet, and outlets opening from said compartments through the top panel; together with an intersticed charge of alkaline material supported by said sheet to substantially fill the housing upper portion about said foraminous sleeve and said compartments.

References Cited in the file of this patent

UNITED STATES PATENTS 2,678,261    Ruth                May 11, 1954